Oct. 7, 1952
G. HERZOG
2,613,326
METHOD OF DETERMINING PROPORTIONS
IN COMPOSITIONS OF SUBSTANCES
Filed June 20, 1950
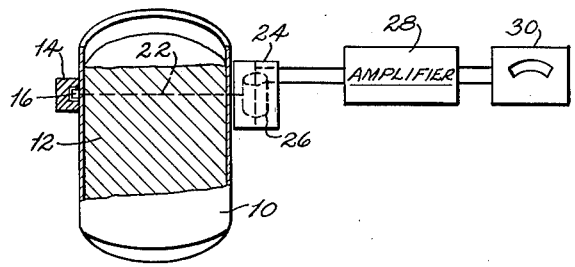
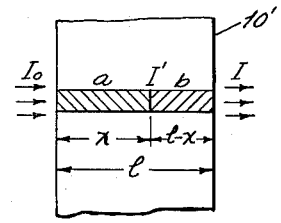
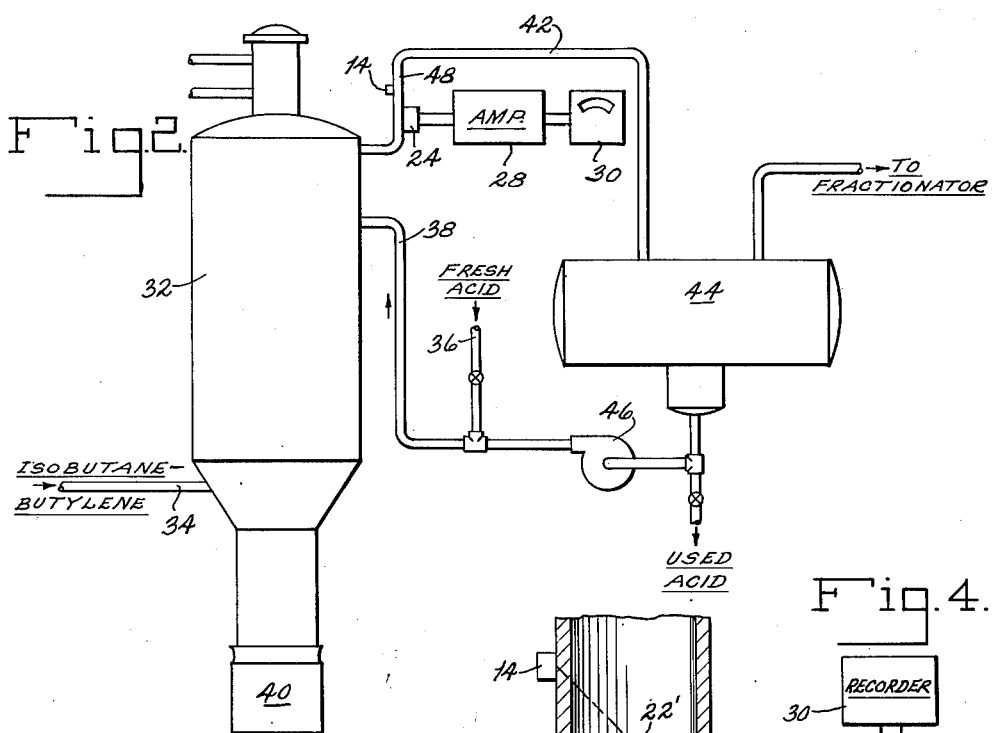
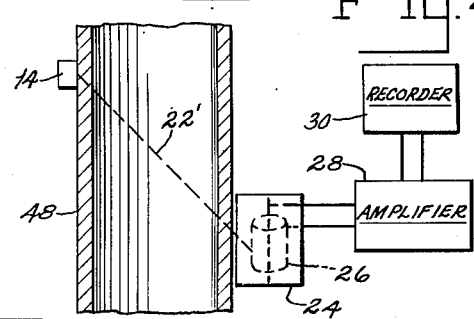
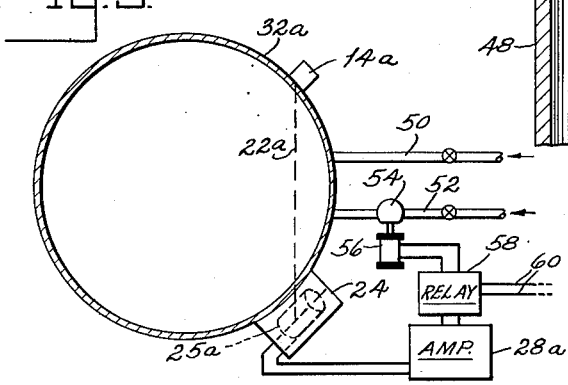
INVENTOR.
GERHARD HERZOG
BY
ATTORNEYS Patented Oct. 7, 1952

2,613,326

UNITED STATES PATENT OFFICE 2,613,326

METHOD OF DETERMINING PROPORTIONS IN COMPOSITIONS OF SUBSTANCES

Gerhard Herzog, Houston, Tex., assignor to The Texas Company, New York, N. Y., a corporation of Delaware Application June 20, 1950, Serial No. 169,258

5 Claims. (Cl. 250—43.5)

This invention relates to a method of measuring or controlling the proportions or ratio of two substances in a composition of those substances and it is the principal object of the invention to provide a method of this kind by means of which accurate determinations can be made of the proportions of two substances in a composition regardless of the form of the composition, i. e., regardless of whether it is a mixture, a solution, emulsion, suspension or a chemical combination and without the necessity of any deformation of the composition, if a solid, and without access to the interior of the vessel or pipe containing the composition, if in the form of a fluid.

This is a division of my copending application Serial No. 574,135, filed January 23, 1945.

Many difficulties are encountered in connection with the determination or measurement of the proportions of two substances in a composition where access is not readily obtainable to the interior of the vessel or pipe holding the composition. Again, where the composition is in the form of, say, a sample of a solid it is very difficult to determine the proportions of the constituents without removing a portion of the sample or otherwise disfiguring or deforming the sample in order to make the analysis. As an example, let us assume that a composition is formed of two substances either in a homogenous or a non-homogeneous mixture and in the form of, say, a block or a brick. Without removing a portion of the block for chemical analysis, it would obviously be difficult to determine the proportions of the two substances. As another example, suppose that a fluid is flowing through a pipe and that the fluid is formed of two substances the ratio of which it is desired to ascertain. Without removing a sample of the flowing fluid for analysis by weighing or by chemical means, it would obviously be difficult to determine the exact ratio of the two substances forming the fluid. It would be still more difficult to make a continuous record showing substantially instantaneously variations in the ratio of the two fluids without continuously removing or by-passing a small amount of the fluid to be used for analysis.

In accordance with the present invention a method has been devised through the use of which the desired results mentioned above, i. e., measurement or control of the proportions of substances in a composition, can be obtained, and this regardless of the form of the composition, i. e., whether it is a solid or a fluid mixture, a solution, emulsion, suspension or a chemical combination. Through the use of the invention it is also possible to determine variations in temperature which may occur in the composition, such as a fluid flowing through a pipe, without removing samples and without any access to the interior of the pipe for the insertion of thermocouple elements, or the like.

In carrying out the invention, a beam of penetrative radiation is transmitted through the composition, the proportions of which it is desired to ascertain and a measurement is made of the intensity of the radiation after it has traversed the composition. The length of the path of the beam through the composition may be selected so that a predetermined accuracy can be obtained. Thus, the beam may pass diagonally through a pipe carrying a fluid composition or it may pass through a selected portion of a vessel in which the composition is being treated. By proper calibration of the measuring instrument, the intensity reading can be made to indicate directly the ratio of the two substances in the composition being examined. For calibration purposes a measurement as described above can be made where the beam of radiation is transmitted through each of the substances separately providing that the length of the path of the beam through the substances is the same as in the case where the beam is transmitted through the mixture or composition. If desired, instead of measuring the intensity of the radiation passing through each of the substances taken alone, measurements can be made through known mixtures, i. e., compositions wherein the proportions or the ratio of the two substances are known, and a calibration curve then prepared from which the ratio of the substances in an unknown composition can subsequently be read directly.

As an example of an application of the invention a description will be given of the use of the method as applied in determining the ratio of acid catalyst to hydrocarbons in an alkylation process wherein isoparaffinic hydrocarbons are alkylated to produce hydrocarbons suitable for an aviation type motor fuel.

For a better understanding of the invention reference may be had to the accompanying drawing in which:

Fig. 1 is a somewhat diagrammatic illustration through a vessel containing a composition of two substances the ratio of which it is desired to ascertain, Fig. 2 is a vertical elevation showing apparatus used in an alkylation process, Fig. 3 is a diagram to which reference will be made in explaining the principles of the invention, Fig. 4 is an enlarged view through a section of pipe showing a somewhat different arrangement of the radiation source and detector, while Fig. 5 is a sectional plan view through a vessel showing an arrangement of apparatus for controlling the proportions of substances of a composition within the vessel.

In Figure 1 of the drawing a vessel 10 is shown as containing a quantity of a composition 12 which may be a mixture of two substances or an emulsion, solution or chemical composition of the two substances. A housing or block 14 of a material such as lead capable of absorbing gamma radiation contains at its inner surface a small amount of a radioactive substance 16, such as radium, and a beam of the penetrative radiation, indicated diagrammatically by the dotted line 22, is transmitted through the walls of the vessel 10 and through the composition 12. At another side of the vessel 10 is a housing 24 containing a suitable detector 26 of penetrative radiation which may comprise a Geiger-Müller counter, a proportional counter or an ionization chamber. The detector 26 is connected to a suitable amplifier 28, the output of which is in turn led to a measuring instrument such as the meter 30. If desired, a suitable preamplifier may be disposed within the housing 24.

With reference to Figure 3 let us assume that the side walls of the vessel 10 of Figure 1 are denoted by the vertical lines 10' and that these walls have no appreciable thickness; that the intensity of the incoming radiation beam is indicated at $I_0$ and that the intensity of the radiation emerging from the vessel is indicated by $I$. Also let us assume that there are two substances "$a$" and "$b$" in the vessel and the cross-hatched portions indicate the relative proportions of these two substances in the path of the beam of transmitted radiation. For purposes of illustration only, the amount of the substance "$a$" is indicated by the block or section marked "$a$" as though this substance were all in one place, likewise that the substance "$b$" is positioned in one place in alignment with the radiation source and the substance "$a$." Then the distance $x$ will designate the proportion of the substance "$a$" in the mixture or composition and $l$ minus $x$ designates the portion of the substance "$b$," $l$ of course, indicating the length of the path of the beam through the composition.

First let us assume that there is only one substance in the vessel 10' and that the beam of radiation therefore passes through nothing other than this substance "$a$" and the walls of the vessel. Then, $$I_a = I_0 e^{-k_a l} \tag{1}$$

where $I_a$ is the intensity of the radiation which has passed through the substance "$a$," and $k_a$ is the absorption coefficient for the substance "$a$."

Assuming then that the substance "$b$" is the only substance in the path of the beam of radiation, $$I_b = I_0 e^{-k_b l} \tag{2}$$

where $k_b$ is the absorption coefficient for the substance "$b$."

Let us assume now that both substances are in the vessel as shown in Figure 3 and that $I'$ is the intensity of the radiation after it has passed through the substance "$a$" and before it reaches the substance "$b$," then $$I' = I_0 e^{-k_a x} \tag{3}$$

and $$I = I' e^{-k_b (l-x)} \tag{4}$$

substituting, $$I = I_0 e^{-k_a x - k_b (l-x)} \tag{5}$$

From Equations 1, 2 and 5 one can solve for the three unknowns $k_a$, $k_b$ and $x$. If $l$ is assumed to be one, then $x$ will be the percentage of the substance "$a$" in the composition "$ab$." In this discussion we have assumed that the walls have no thickness. In an actual case where the composition is in a container, the equations would obviously include a factor to represent the absorbing effect of the walls.

It is to be understood that the substances "$a$" and "$b$" within the path of the radiation beam can be mixed in any manner or they can comprise a solution, an emulsion or dispersion, or a chemical combination of the two substances since the absorption of the radiation in the composition depends only upon the atomic structure. In other words, the absorption of gamma rays depends only on the number of atoms per unit volume and it remains unchanged as long as the number of atoms remains the same, regardless of the nature of the composition, i. e., whether it is in the form of a mixture, solution, etc.

It will be clear from the above that once the measurements are obtained for each substance separately, it will thereafter be necessary merely to take a single reading on any mixture or solution of these substances and from that reading the proportion or ratio of the substances can be quickly determined. If desired, a curve can be prepared either for the two substances separately or for known ratios of the two substances, and then the ratio of the unknown composition read directly from the curve. While the container 10 has been described as a vessel, it is contemplated that it may be a pipe or conduit through which the composition 12 is flowing. The pipe should be full so that the length of the path of the radiation beam through the composition will not vary.

In Figure 2 the invention is illustrated as applied to the determination of the ratio of the acid catalyst to the hydrocarbons in the emulsion flowing from a contactor of the "Stratco" type in an alkylation system. The contactor is represented at 32 into which the isoparaffinic hydrocarbons isobutane and butylene enter through the pipe 34. The fresh acid-catalyst enters the contactor through the pipes 36 and 38 and a motor 40 serves to drive an agitator, not shown, so as to emulsify the acid and hydrocarbons. The emulsion is drawn from the upper portion of the contactor 32 through the pipe 42 and is passed to a separator 44. Part of the acid settling in the separator may be recycled by means of the pump 46 through the pipe 38 into the contactor. The pipe 42 is illustrated as having a short vertical section 48 and on the opposite sides of this section are placed the housing 14 containing the source of radiation and the housing 24 containing the radiation detector. The output of the detector passes to the amplifier 28 and then to the meter 30 as has been described hereinbefore. By placing the source and the detector at opposite sides of a vertical pipe one is assured that the pipe will remain full of the emulsion. Assuming that intensity measurements have been made of the acid alone and of the hydrocarbons alone when occupying the pipe section 48, or that the instrument 30 has been calibrated in any other suitable manner it is then merely necessary to observe or record the reading of the meter 30 to determine the proportions or the ratio of the acid and the hydrocarbons when the emulsion is passing through the pipe section 48.

The greater the length of the path of the radiation through the composition, the more accurate will be the measurements. Thus, if it is desired to measure density variations of the order of, say, plus or minus 0.5° Bé., in the emulsion flowing through the pipe 48 (Fig. 2), the housing 24 can be raised or lowered on the pipe 48 so that the path of the beam will be sufficiently long to provide this accuracy. In Figure 4 is an enlarged section of a pipe which may, for instance, be the pipe 48 of Figure 2 with the housing 14 containing the source positioned against the outer surface of the pipe and the housing 24 containing a detector 26 positioned adjacent the opposite side of the pipe but in a lower position with respect to the housing 14. The path of the beam 22' is therefore increased and greater accuracy will be attained. The source must, of course, have sufficient strength to transmit radiation through the desired path 22' to actuate the detector 26.

Figure 5 is a sectional plan view showing a modification in which a housing 14a containing a source of radiation is mounted on the exterior surface of a vessel 32a, which may be, for instance, the contactor 32 of Figure 2. Also disposed adjacent the exterior of the vessel across, but not necessarily exactly opposite the housing 14a, is a housing 24a containing a radiation detector 26a. The housing 24 is positioned with respect to the housing 14a so that the radiation beam 22a within the emulsion will be long enough to provide measurements of the desired accuracy. In this manner the acid-hydrocarbon ratio of the emulsion 32a can be measured while the emulsion is still being circulated within the vessel.

Although the invention has been described as a method of measuring or determining ratios of substances in a composition, it is contemplated that these determinations can be used in connection with control in manufacturing processes. As shown in Figure 5, the vessel 32a is provided with two intake pipes or conduits 50 and 52, one for each of the substances to be treated within the vessel. The conduit 52 is provided with a valve 54 actuable by suitable means such as a solenoid illustrated diagrammatically at 56. The output of the detector 26a is connected to an amplifier 28a the output of which in turn is led to a relay 58. The relay is connected to the solenoid 56 and is adapted in any well known manner to connect a source of electric current 60 to the solenoid when the relay is actuated by a predetermined increase or decrease in the output of the amplifier 28a. Thus, assuming for example that isobutane-butylene enters the vessel 32a through the pipe 50 and that the acid catalyst enters through the pipe 52, the apparatus shown in Figure 5 can be easily adjusted to maintain a desired ratio between these substances in the emulsion within the vessel 32a. In case the ratio should change more than an allowable amount, the response of the detector 26a will change and the amplifier output will cause the relay 58 to operate to actuate the solenoid 56 to open or close the valve 54, as the case may be, to control the amount of acid flowing into the vessel 32a.

The method is applicable in many other processes such as in continuous grease manufacture to assure uniformity of batches, in determining the extent of polymerization in rubber manufacture, the extent of cracking and the extent of dehydrogenation in dehydro operations, and in the control of fractionation operations, particularly those applied to the separation of material in high degree of purity. The foregoing are by way of example only.

From the principles of the invention which have been described in the foregoing paragraphs it will also be observed that since the intensity of the radiation beam passing through a composition varies with the density of that composition and since the density will vary with changes in temperature in the composition, the invention is also applicable in the determining or measuring of temperature. Thus, with reference again to Figure 2, if the meter 30 is calibrated in temperature and the temperature of the emulsion passing through the pipe section 48 changes, the density of the emulsion will change accordingly and the meter 30 will show a different reading, indicating the new temperature. Thus without the use of thermometers, thermocouples and the like, and without the necessity of access to the interior of the pipe section 48, indications or a record may be had of these temperature variations. There is usually a lag in the action of most temperature sensitive devices such as thermocouples and the like but with the present method the meter 30 will respond substantially instantaneously to variations in density of the composition within the pipe 48, and thus to variations in temperature.

While the source 16 has been described as radium and the radiation beam as comprising gamma rays, it is to be understood that other types of radiation can be used. For instance, neutrons emitted from a mixture of radium and berylium could be utilized, the detector 26 in such a case comprising preferably an ionization chamber or a proportional counter. Likewise, in certain instances an artificially radioactive source may be advantageous. Where "penetrative radiation" is referred to in the claims, it is contemplated that any of these radiations or others, such as for example, X-rays, alpha rays, electrons and protons can be used.

It is to be understood that in the claims which follow, although reference may be made to a specific form of composition such as a "mixture," it is intended that all other forms of composition are to be included within the meaning of this term, such as solutions, emulsions, suspensions, dispersions, chemical combinations and the like.

Obviously many other modifications and variations of the invention, as hereinbefore set forth, may be made without departing from the spirit and scope thereof, but only such limitations should be imposed as are indicated in the appended claims.

I claim:

1. The method of determining the proportions of two substances in a mixture which comprises transmitting a beam of electrons through said mixture over a predetermined path, transmitting said beam through mixtures of said substances wherein the proportions of the substances are known while maintaining the length of the path the same as for said first transmission, measuring the intensities of said beam after being transmitted through said unknown mixture and said known mixtures, and from a comparison of the measurements so obtained calculating the proportions of the substances in the unknown mixture.

2. The method of determining the proportions of two substances in a composition flowing through a pipe which comprises transmitting substantially laterally through said pipe a beam of electrons when the pipe is conducting a composition of said substances and when the pipe contains each substance separately, observing the intensities of the beam after it has traversed the pipe, and from the measurements so obtained calculating said proportions.

3. The method of determining the ratio of two substances in a composition which comprises transmitting a beam of electrons through said composition and through other compositions of the same substances wherein the ratio of the substances is known, while maintaining constant the lengths of the paths of said beam through the known and unknown compositions, and measuring the intensities of the radiation after passing through said compositions, and from said measurements calculating the proportions of the substances in the first mentioned composition.

4. The method of determining the proportions of two substances in a mixture in an opaque container which comprises transmitting through said container and said substance a beam of electrons, repeating this operation when the container holds mixtures of said substances in known proportions, observing the intensities of the beam during each transmission, and from the measurements so obtained, calculating said proportions.

5. The method of determining the proportions of two substances in a mixture in an opaque container which comprises transmitting a beam of electrons through at least a portion of the mixture in said container, repeating this operation when the container holds mixtures of said substances in known proportions while maintaining the length of the path of said beam the same as for said first transmission, observing the intensities of the beam during each transmission, and from the measurements so obtained calculating said proportions.

GERHARD HERZOG.

REFERENCES CITED

The following references are of record in the file of this patent:

UNITED STATES PATENTS

| Number | Name | Date |
|---|---|---|
| Re. 22,531 | Hare | Aug. 22, 1944 |
| 2,487,797 | Friedman et al. | Nov. 15, 1949 |
| 2,534,352 | Herzog | Dec. 19, 1950 |